United States Patent [19]
Matsubara et al.

[11] Patent Number: 5,392,751
[45] Date of Patent: Feb. 28, 1995

[54] V-TYPE ENGINE WITH SUPERCHARGER MOUNTING

[75] Inventors: Taiji Matsubara, Higashihiroshima; Naoyuki Yamagata, Hiroshima, both of Japan

[73] Assignee: Mazda Motor Corporation, Hiroshima, Japan

[21] Appl. No.: 125,157

[22] Filed: Sep. 23, 1993

[30] Foreign Application Priority Data

Sep. 24, 1992 [JP] Japan .................. 4-280709

[51] Int. Cl.⁶ ............................................. F02B 33/38
[52] U.S. Cl. ............................................. 123/559.1
[58] Field of Search ...................................... 123/559.1

[56] References Cited

U.S. PATENT DOCUMENTS

| | | | |
|---|---|---|---|
| 1,564,842 | 12/1925 | Fornaca | 123/559.1 X |
| 1,625,597 | 4/1927 | Fornaca | 123/559.1 X |
| 2,963,006 | 12/1960 | Karde | 123/559.1 X |
| 4,932,368 | 6/1990 | Abe et al. | 123/559.1 X |

FOREIGN PATENT DOCUMENTS

| | | | |
|---|---|---|---|
| 62-121829 | 6/1987 | Japan . | |
| 2-248621 | 10/1990 | Japan | 123/559.1 |
| 3-253724 | 11/1991 | Japan | 123/559.1 |

*Primary Examiner*—Michael Koczo
*Attorney, Agent, or Firm*—Keck, Mahin & Cate

[57] ABSTRACT

A novel mounting for a supercharger in a V-type engine is provided such that the supercharger is mounted in a space between the cylinder banks of a V-type engine. The mounting structure of the intake manifold suspends the supercharger, and the lower portion of the supercharger positions the supercharger with respect to the engine block.

4 Claims, 5 Drawing Sheets

V-TYPE ENGINE WITH SUPERCHARGER MOUNTING

BACKGROUND OF THE INVENTION

1. Field of the Invention

The present invention relates to a V-type engine of an automotive vehicle having a novel mounting for a supercharger and more especially to supporting the supercharger in a space between right and left cylinder heads suspended from the intake manifold.

2. Description of the Related Art

In automobiles, frequently a supercharger is mounted on the engine and serves to increase the output torque of the engine. Basically, there are two kinds of superchargers. One is the well known exhaust turbine type supercharger which charges intake air by operating the turbine based on pressure of the exhaust gas from the engine. The other type, also well known, is the mechanical supercharger which comprises an air compressor operated by rotation of the crankshaft of the engine. An example of the second type is shown in Japanese Unexamined Laid-Open Patent 62-121829.

When a supercharger of either type is mounted in an engine compartment or room, it is necessary to avoid interference with other auxiliary equipments of the engine and with other structures, and to locate the supercharger compactly in the engine compartment or room.

Accordingly, in a V-type engine, the supercharger usually is disposed in the space between right and left cylinder banks of the engine block. However, it is easy to raise the temperature of this space by transferring heat from the combustion chambers (cylinders) of the banks. Therefore, in case of fixing the supercharger by way of brackets attached to the banks, the supercharger receives an excessive heat load from the engine, and the supercharger is heated making the quality of its performance worse. Further, the air charge efficiency of the supercharger is made worse by thermal expansion of the charged air in the charger due to the temperature increase of the supercharger. Furthermore, a disturbing problem results in that the exhaust sound of exhaust air releasing from the supercharger is comparatively louder.

SUMMARY OF THE INVENTION

An object of the present invention is to provide a supporting structure for the supercharger which prevents heat damage, excessive thermal expansion of the charged air and undue radiation of exhaust sound to the surrounding ambient of the engine compartment or room while effectively fixing or mounting the supercharger in the space between the banks.

The above object is accomplished by providing a supporting structure for a supercharger that supports the supercharger in a space between cylinder banks of a V-type engine, which comprises an intake manifold disposed in a space between the cylinder banks from which the supercharger is suspended; and having the lower part of the supercharger positioned at the bottom of the space between the cylinder banks.

A second aspect of the invention is characterized by providing the exhaust port of the supercharger at a lower portion of the supercharger for exhausting charged air from the supercharger along the bottom of the space, bottom of the Vee, between the cylinder banks.

A third aspect of the invention is characterized by providing an exhaust conduit extending along the bottom of the Vee and connecting same with an intercooler that leads to surge tanks connected to the intake manifold.

A fourth aspect of the invention is characterized by providing a water jacket around the exhaust conduit, the jacket being formed in the block for cooling the charged air being exhausted.

According to the above aspects of the invention, the novel mounting structure of the supercharger is able to prevent the supercharger from heat damage including excessive thermal expansion and to control the charged air expansion and radiation of the exhaust sound to surrounding structures and areas in the engine compartment or room effectively.

Especially, according to the second aspect of the invention, the structure of the supercharger and its mounting is greatly simplified.

According to the third aspect of the invention, the lower structure of the supercharger is surrounded by the inner surfaces of the engine block at the bottom of the Vee. Therefore, radiation of the exhaust sound of the supercharger is prevented efficiently.

Further, according to the fourth aspect of the invention, the water jacket formed around the lower structure of the supercharger cools the charged air being exhausted and prevents efficiently the exhaust sound of the supercharger from being radiated to surrounding structures or areas.

DETAILED DESCRIPTION OF THE PREFERRED EMBODIMENT

The present invention will now be explained in more detail with reference to the figures of the drawings.

Figure 1:
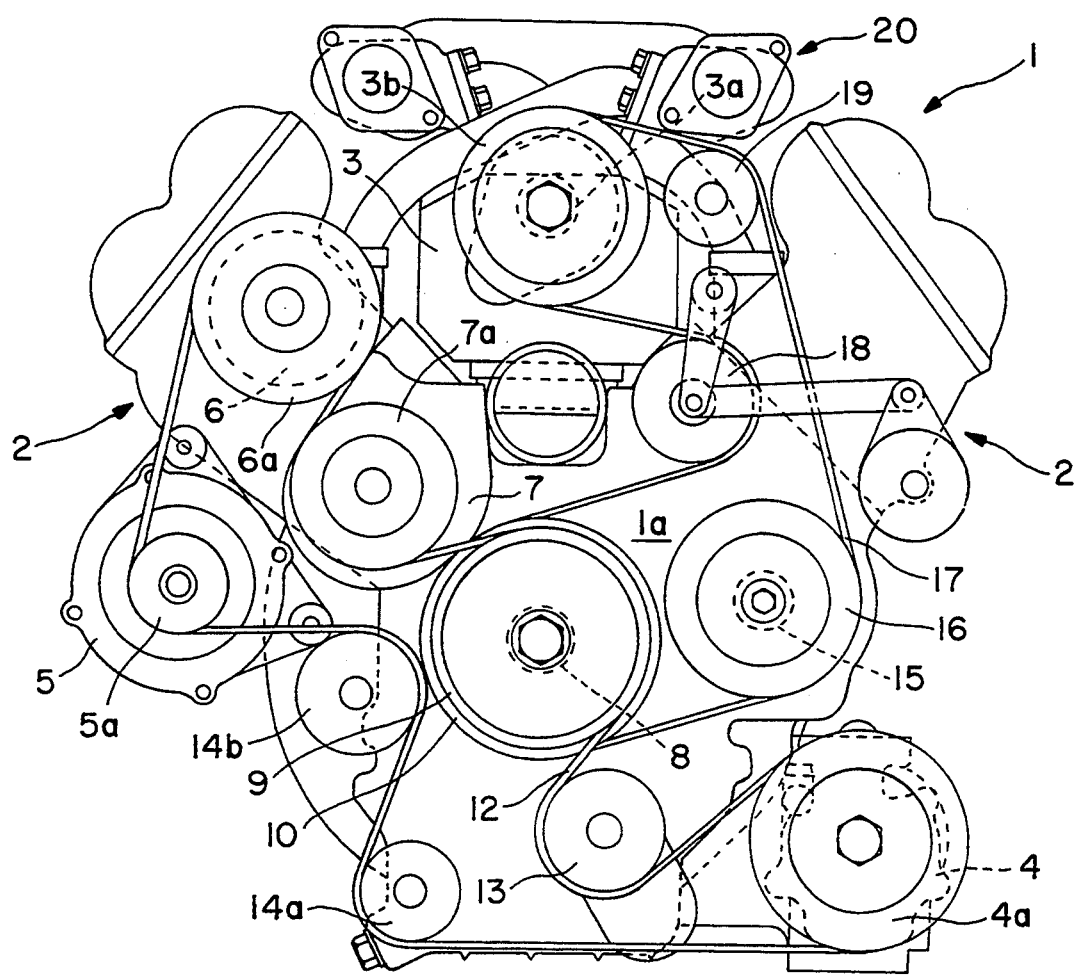
FIG. 1 is a front view of a V-type engine having a supercharger in accordance with a preferred embodiment of the present invention.

FIG. 1 is a front view of an engine according to a preferred embodiment of the present invention. Engine 1 is a V-type engine having right and left cylinder banks 2 and 2 each of which house a plurality of cylinders. A mechanical supercharger 3, as an auxiliary equipment of the engine, is disposed or located in the Vee space defined between the two banks 2 and 2. A compressor of an air conditioner 4, an alternator 5, an oil pump 6 of a power steering unit, and a water pump 7 are disposed relative to the engine main body 1a and surround the engine main body 1a. All of the above auxiliary equipment of the engine 1 are operated by a crank shaft 8 of the engine 1.

One end of the crank shaft 8 projects outwardly from the engine main body 1a and has fixed to it a first crank pulley 9 for operating the compressor 4 and the alternator 5, and a second crank pulley 10 for operating the mechanical supercharger 3. The first pulley 9, pulley 4a of the compressor 4, pulley 5a of the alternator 5, pulley 6a of the oil pump 6 and pulley 7a of the water pump 7 are driven by a transfer belt 12 that engages pulley with pulley 9 being driven by the crank shaft 8.

An auto-tensioner 13 for adjusting the tension of the transfer belt 12 automatically is disposed between the first crank pulley 9 and the pulley 4a of the compressor 4, and idlers 14a and 14b are disposed between the pulley 4a of the compressor 4 and the pulley 5a of the alternator 5.

The second pulley 10 driven by crank shaft 8, pulley 16 disposed at an end of a transfer axle 15 for operating an oil pump (not shown) associated with the engine main body 1a, and pulley 3b fixed at an input shaft 3a of the supercharger 3 are driven in common by a transfer belt 17. Therefore, the supercharger 3 is operated by the crank shaft 8 by way of the belt 17 and the input shaft 3a of the supercharger 3.

An auto-tensioner 18 for adjusting the tension of the transfer belt 17 automatically and an idler 19 are disposed between the second crank pulley 10 and the pulley 3b.

Figure 2:
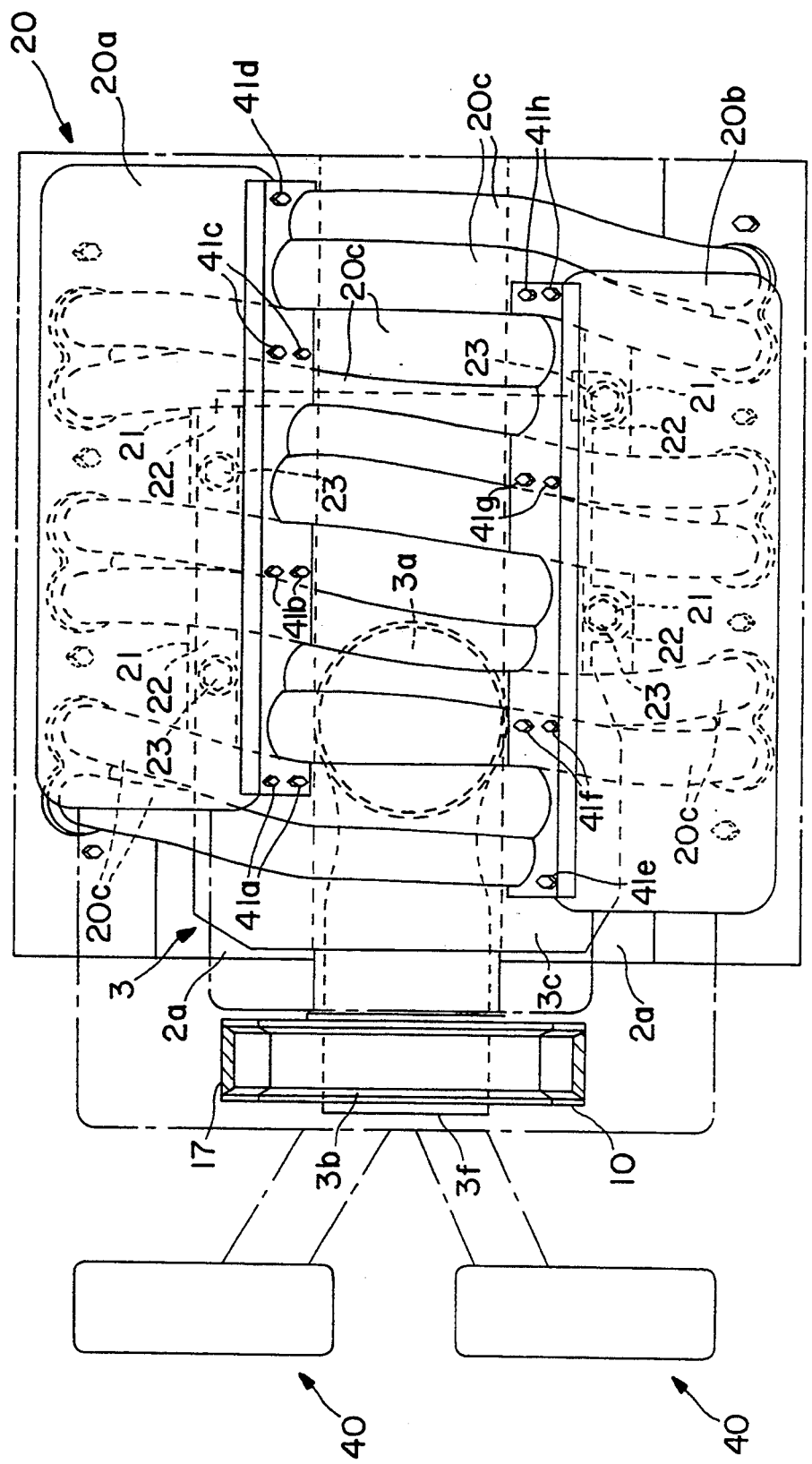
FIG. 2 is a plan view of a V-type engine having a supercharger in accordance with a preferred embodiment of the present invention.
Figure 4:
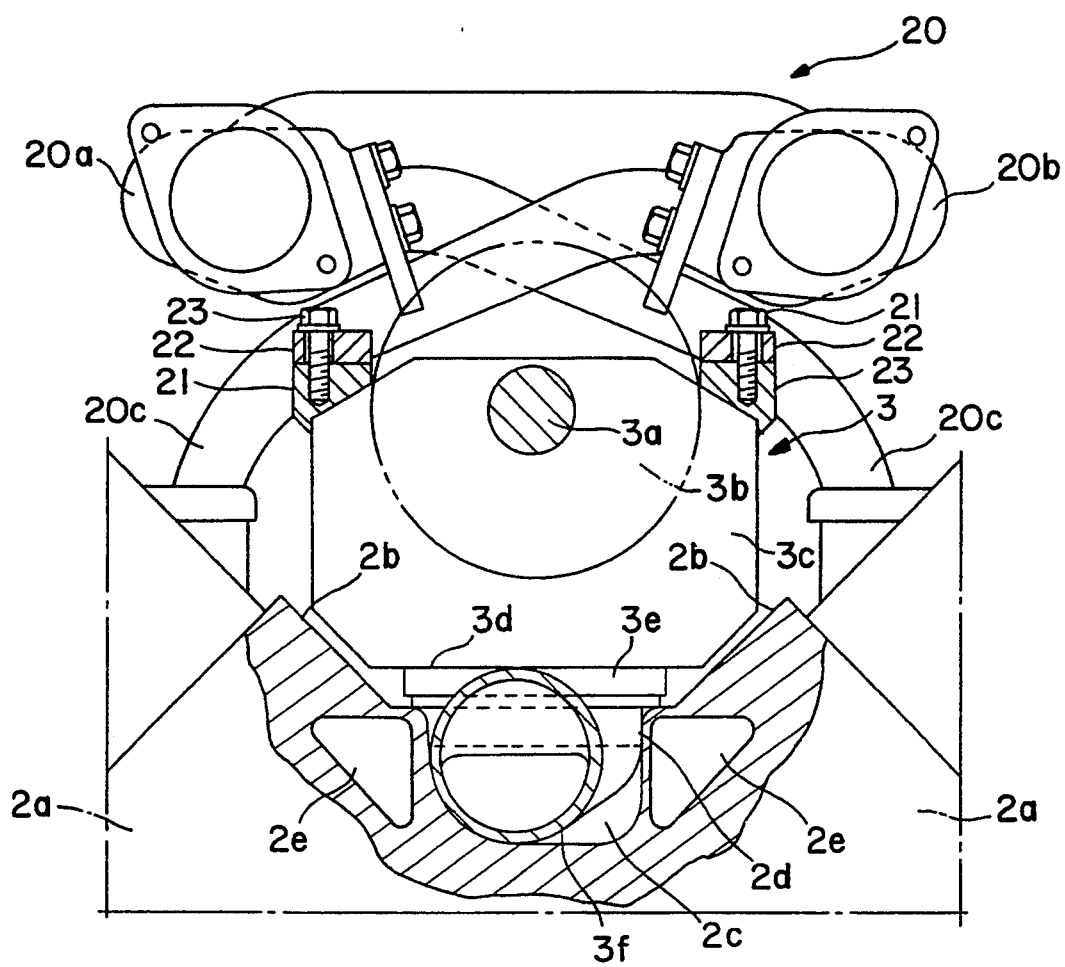
FIG. 4 is a cross sectional view of a part of a V-type engine having a supercharger in accordance with a preferred embodiment of the present invention.

In this embodiment, an intake manifold 20 is disposed at the top of the Vee and is positioned directly above the supercharger 3 and between the banks 2 and 2 as shown FIG. 2 and FIG. 4.

The intake manifold 20 has right and left surge tanks 20a and 20b each of which is disposed directly above one of the banks 2 and 2, and a plurality of intake pipes 20c connecting the surge tanks 20a and 20b with the intake ports in the two cylinder banks 2. The intake pipes 20c are formed as one mounting and are fixed to the surge tanks 20a and 20b by bolts 41a to 41h. The main body 3c of the charger 3 is suspended by or mounted on the intake manifold 20. More particularly, four brackets 21 are fixed at the side of the main body 3c of the supercharger 3, and four intake pipes 20c have corresponding bracket members 22 fixed to them for attaching to the brackets 21, respectively. Accordingly, the supercharger 3 is mounted and suspended to the intake manifold 20 by way of the brackets 21 of the supercharger 3 and bracket members 22 of the intake pipes 20c which are fixed together by bolts 23.

Further, exhaust port 3e for charged air is formed in the lower surface 3d of the mainbody 3c. The exhaust port 3e is received or seated in a recess 2c which is formed at the bottom of the Vee defined by banks 2. The mainbody 3c has a bench along each side which lies opposite inclined surfaces 2b and 2b formed at the inside of cylinder banks 2 in the regions 2a of each of the banks 2 at its bottom near the lower surface 3d of the charger 3.

The exhaust port 3e has the function of positioning the main body 3c of the supercharger 3 in a fixed position relative to the engine block 2a and the cylinder banks 2 and 2 by fixing the exhaust port 3e to the port 2d of recess 2c.

A conduit 3f leading from port 3e extends along recess 2c toward the location of the crank shaft pulleys to exhaust the charged air. A water jacket 2e formed in the engine block around conduit 3f cools the engine block 2a to in turn cool nearby exhaust port 3e and the conduit 3f as shown FIG. 3 and FIG. 4.

Figure 3:
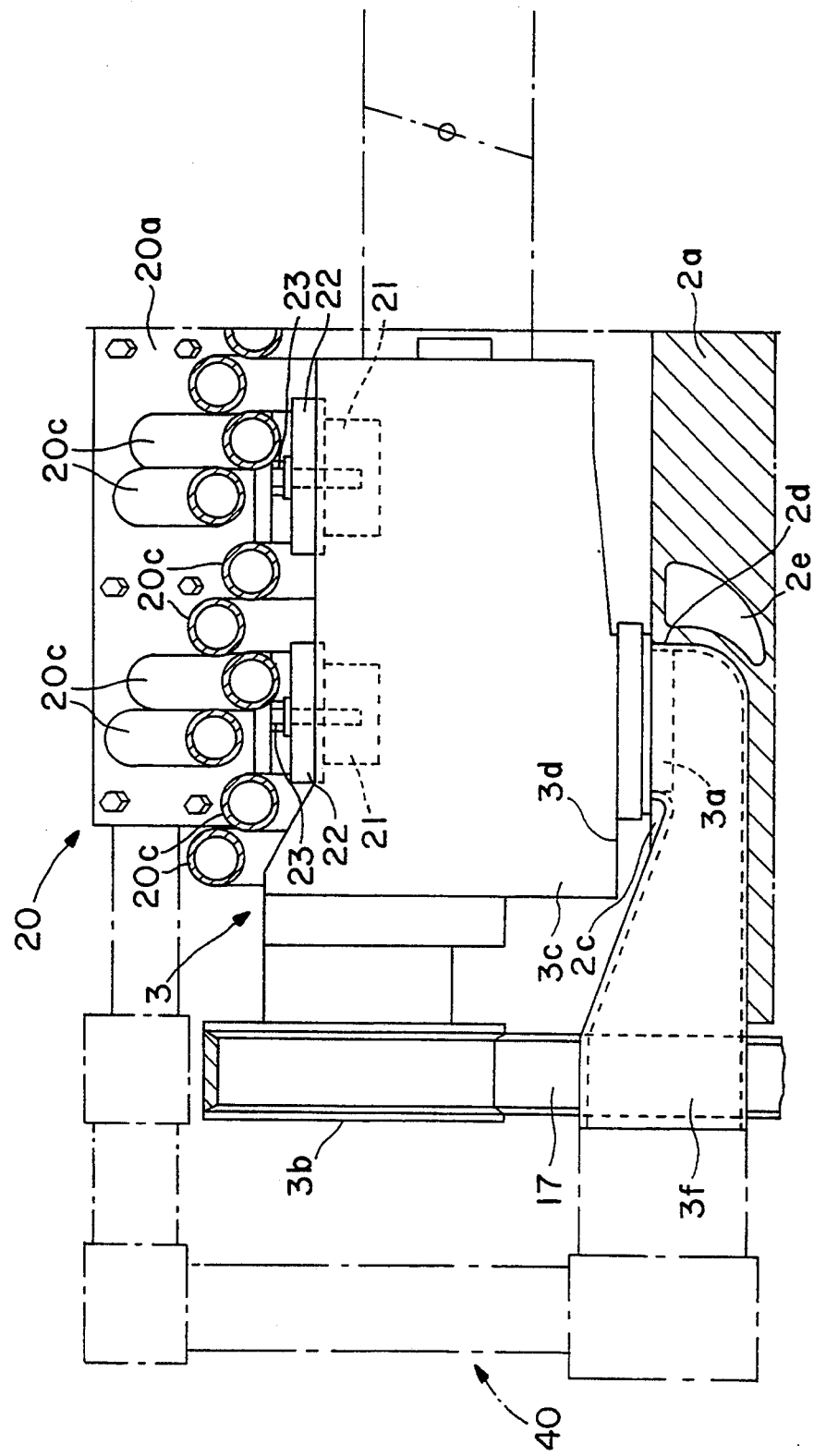
FIG. 3 is a cross sectional view along a crank shaft axle of a part of a V-type engine having a supercharger in accordance with a preferred embodiment of the present invention.

The exhausted charged air from the supercharger 3 is transferred to an inter-cooler 40 by way of the exhaust port 3e and the conduit 3f as shown in FIG. 2 and FIG. 3 and the transferred air from the inter-cooler 40 is transferred to each of the right and left surge tanks 20a and 20b from where it is supplied to each of the combustion chambers (not shown) formed at the banks 2 by way of the intake pipes 20c.

In the above embodiment, the supercharger 3 is mounted to and suspended from the intake manifold 20 which is mounted between the cylinder banks 2 and 2 in the Vee space of the V-type engine. Because the supercharger 3 is not mounted to the engine directly, the thermal expansion of the engine 1 doesn't affect the supercharger 3 adversely. Further, the supercharger 3 is maintained in a predetermined position between the cylinder blocks 2a of the banks 2 by the exhaust port 3e formed at the lower surface 3d of the supercharger 3 being received in and positioned in recess 2c.

Figure 5:
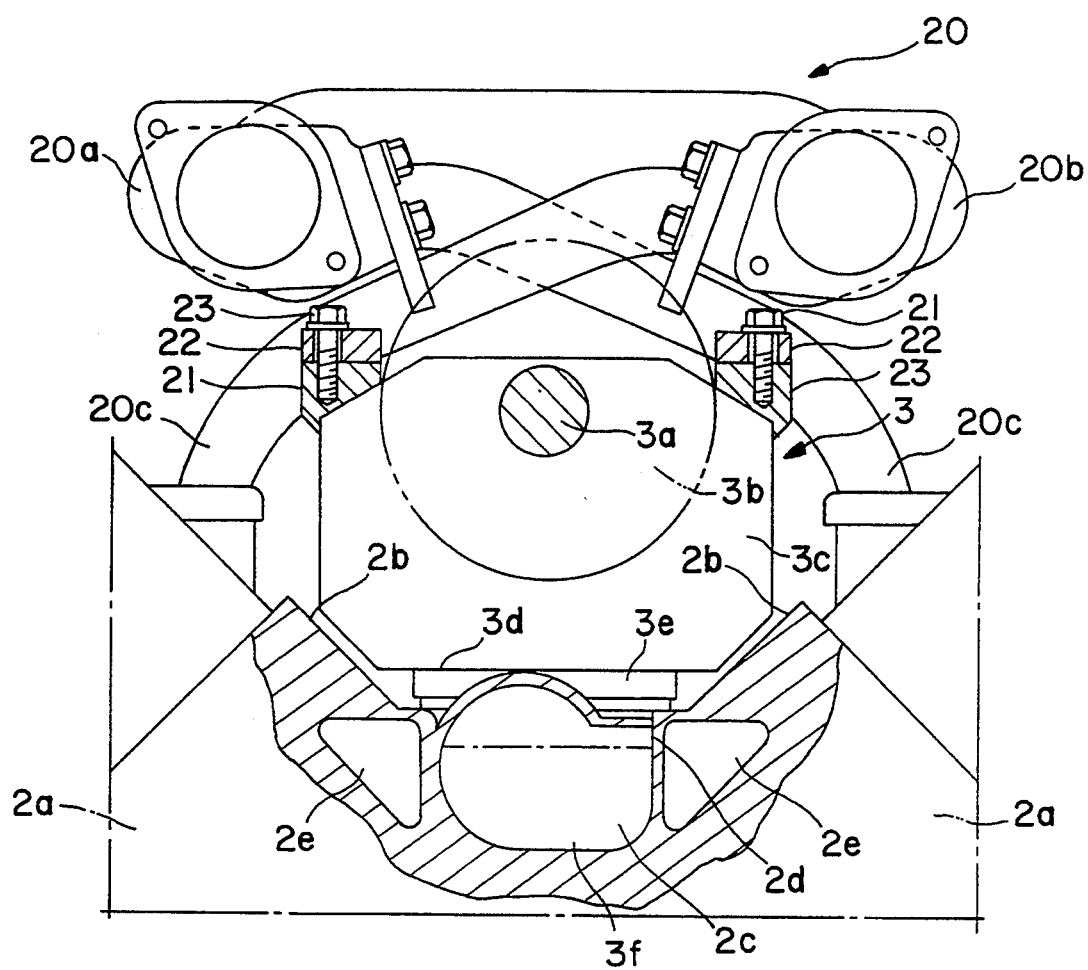
FIG. 5 is a cross sectional view of a part of a V-type engine having a supercharger in accordance with a preferred second embodiment of the present invention.

In the above embodiment, the exhaust port 3e is formed as part of the mainbody 3a. However, the exhaust port 3e can be formed or provided as part of the cylinder block 2a as shown in FIG. 5.

Further, as the exhaust port 3e is disposed in recess 2c which is formed at the bottom of the Vee space and which is surrounded by inner inclined surfaces 2b are opposite to levels at the lower edges of mainbody 3a, and the exhaust port 3e is connected with the conduit 3f extending toward the crank shaft pulleys in the recess 2c, both the exhaust port 3e and the entire conduit 3f are surrounded by the inner inclined surfaces 2b of the cylinder blocks 2a, and the lower surface 3d of the supercharger 3. Therefore, the exhaust sound of the supercharger 3 is prevented efficiently by the above structure from radiating to surrounding structure or areas.

Furthermore, as the water jacket 2e is formed around the exhaust port 3e and the conduit 3f, the cooling water of the water jacket 2e also helps to prevent efficiently radiation of the exhaust sound of the supercharger 3.

Although the invention has been described in terms of preferred embodiments, changes may be made which do not depart from the inventive concepts taught herein. Such changes are deemed to fall within the purview of the invention as claimed.

What is claimed is:

1. A V-type engine comprising:
   an engine block having two cylinder banks disposed in a Vee relation with a Vee space defined therebetween;
   an intake manifold, connected to intake ports in said cylinder banks, disposed in the Vee space between the cylinder banks;
   a supercharger, supported by said intake manifold, disposed in the Vee space below the intake manifold and having an exhaust port, formed at a bottom thereof, for exhausting charged air from the supercharger and positioning the supercharger with respect to the engine block at a bottom of the Vee space, the intake manifold having two groups of intake pipes, a first group of the two groups of intake pipes extending from an inside surface of a first cylinder bank of said two cylinder banks to a second cylinder bank of said two cylinder banks and a second group of the two groups of intake pipes extending from an inside surface of the second cylinder bank to the first cylinder bank, the two groups of intake pipes intersecting above the supercharger; and mounting means for mounting the supercharger to the intake manifold, having two mounting portions positioned on each side of a location at which the two groups of intake pipes intersect, so as to define a space between the location at which the two groups of intake pipes intersect and a top of the supercharger.

2. A V-type engine according to claim 1, wherein the intake manifold has a plurality of pipes connected to the two cylinder banks and at least one pipe connected to each cylinder bank includes a part of the mounting means for mounting the supercharger to the intake manifold.

3. A V-type engine according to claim 1, further comprising an exhaust conduit connected with the exhaust port and extending along the bottom of the Vee space.

4. A V-type engine according to claim 3, further comprising a water jacket formed in the engine block around the exhaust port and the exhaust conduit for cooling same.

* * * * *